(12) United States Patent
Bateni et al.

(10) Patent No.: US 8,285,582 B2
(45) Date of Patent: Oct. 9, 2012

(54) AUTOMATIC CALCULATION OF FORECAST RESPONSE FACTOR

(75) Inventors: Arash Bateni, Toronto (CA); Edward Kim, Toronto (CA); Philippe Hamel, Laval (CA); Stephen Szu Chang, Waterloo (CA)

(73) Assignee: Teradata US, Inc., Dayton, OH (US)

( * ) Notice: Subject to any disclaimer, the term of this patent is extended or adjusted under 35 U.S.C. 154(b) by 867 days.

(21) Appl. No.: 12/336,203

(22) Filed: Dec. 16, 2008

(65) Prior Publication Data

US 2010/0153179 A1   Jun. 17, 2010

(51) Int. Cl.
*G06Q 10/00*   (2012.01)
*G06Q 30/00*   (2012.01)
(52) U.S. Cl. .................................................. 705/7.31
(58) Field of Classification Search .............. 705/7.31, 705/7.25
See application file for complete search history.

(56) References Cited

U.S. PATENT DOCUMENTS

| | | | | |
|---|---|---|---|---|
| 5,712,985 A * | 1/1998 | Lee et al. | ........... | 705/7.31 |
| 5,953,707 A * | 9/1999 | Huang et al. | ........... | 705/7.25 |
| 6,151,582 A * | 11/2000 | Huang et al. | ........... | 705/7.25 |
| 6,591,255 B1 * | 7/2003 | Tatum et al. | ........... | 706/25 |
| 7,584,116 B2 * | 9/2009 | Kakouros et al. | ........... | 705/7.31 |
| 7,946,474 B1 * | 5/2011 | Agrawal | ........... | 235/376 |
| 2003/0105661 A1 | 6/2003 | Matsuzaki et al. | | |
| 2006/0178927 A1 | 8/2006 | Liao | | |
| 2006/0200376 A1 | 9/2006 | Wang et al. | | |
| 2006/0271422 A1 | 11/2006 | Rakesh et al. | | |
| 2010/0235225 A1 * | 9/2010 | Bateni et al. | ........... | 705/10 |

OTHER PUBLICATIONS

Forecasting Using Eviews 2.0: An Overivew, Publication Date Unknown) from http://faculty.washington.edu/ezivot/introforecast.PDF.*

* cited by examiner

*Primary Examiner* — Beth V Boswell
*Assistant Examiner* — Folashade Anderson
(74) *Attorney, Agent, or Firm* — Schwegman, Lundberg, Woessner

(57) ABSTRACT

A forecast response factor (RF) determines how quickly product demand forecasts should react to recent changes in demand. When a product sales pattern changes (e.g., a sudden increase in product demand), RF is adjusted accordingly to adjust the forecast responsiveness. The present subject matter provides automatic calculation of the RF, based at least in part on the nature of the product sales (autocorrelation) and the status of recent forecasts (bias).

18 Claims, 12 Drawing Sheets

| ACTUAL | SHIFTED |
|---|---|
| 48 | |
| 27 | 48 |
| 24 | 27 |
| 30 | 24 |
| 51 | 30 |
| 75 | 51 |
| 60 | 75 |
| 54 | 60 |
| 3 | 54 |
| 15 | 3 |
| 3 | 15 |
| 3 | 3 |
| 30 | 3 |
| | 30 |

Fig. 5

| WEEK | AC | RF |
|---|---|---|
|  |  |  |
|  |  |  |
|  |  |  |
|  |  |  |
|  |  |  |
|  |  |  |
| 7 | 0.995 | 0.531 |
| 8 | 0.997 | 0.685 |
| 9 | 0.994 | 0.790 |
| 10 | 0.998 | 0.784 |
| 11 | 0.998 | 0.896 |
| 12 | 0.991 | 0.646 |
| 13 | 0.981 | 0.820 |
| 14 | 0.966 | 0.868 |

| WEEK | AC | RF |
|---|---|---|
|  |  |  |
|  |  |  |
|  |  |  |
|  |  |  |
|  |  |  |
|  |  |  |
| 7 | 0.415 | 0.708 |
| 8 | 0.504 | 0.266 |
| 9 | -0.534 | 0.100 |
| 10 | 0.044 | 0.522 |
| 11 | -0.288 | 0.267 |
| 12 | -0.328 | 0.183 |
| 13 | -0.414 | 0.500 |
| 14 | -0.150 | 0.500 |

| WEEK | n | B | nB |
|---|---|---|---|
|  |  |  |  |
|  |  |  |  |
|  |  |  |  |
|  |  |  |  |
|  |  |  |  |
|  |  |  |  |
| 7 | 1 | 0.067 | 0.067 |
| 8 | 2 | 0.186 | 0.373 |
| 9 | 3 | 0.195 | 0.585 |
| 10 | 4 | 0.142 | 0.569 |
| 11 | 5 | 0.159 | 0.795 |
| 12 | 6 | 0.050 | 0.300 |
| 13 | 7 | 0.094 | 0.659 |
| 14 | 8 | 0.096 | 0.771 |

AUTOMATIC CALCULATION OF FORECAST RESPONSE FACTOR

BACKGROUND

Accurately determining demand forecasts for products is a paramount concern for retail organizations. Demand forecasts are used for inventory control, purchase planning, work force planning, and other planning needs of organizations. Inaccurate demand forecasts can result in shortages of inventory that are needed to meet current demand, which can result in lost sales and revenues for the organizations. Conversely, inventory that exceeds a current demand can adversely impact the profits of an organization. Excessive inventory of perishable goods may lead to a loss for those goods, and heavy discounting of end of season products can cut into gross margins.

SUMMARY

This challenge makes accurate consumer demand forecasting and automated replenishment techniques more necessary than ever. A highly accurate forecast not only removes the guess work for the real potential of both products and stores/distribution centers, but delivers improved customer satisfaction, increased sales, improved inventory turns and significant return on investment.

According to certain embodiments described herein, demand forecast accuracy is improved by automatically calculating a forecast response factor (RF) to determine how quickly the forecast should respond to the changes in demand. RF is automatically calculated depending on various factors, such as the nature of the product sales and recent sales patterns. When a product sales pattern changes (e.g., a sudden increase in product demand), RF is automatically tuned accordingly to adjust the forecast responsiveness.

BRIEF DESCRIPTION OF THE DRAWINGS

FIG. 5 illustrates a table showing the shift of auto-correlation.

DETAILED DESCRIPTION

Figure 1:
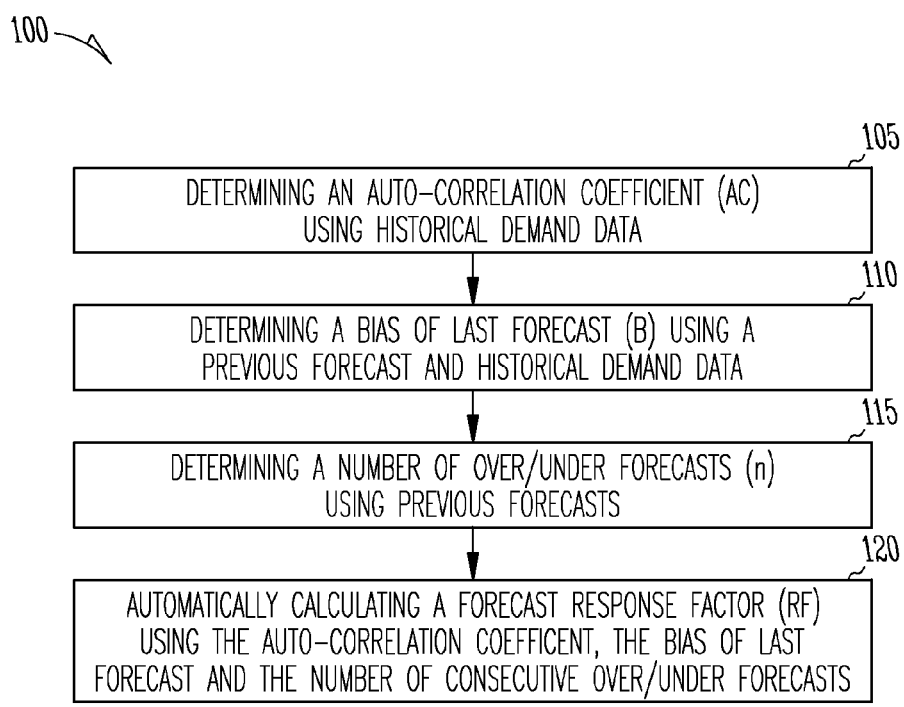
FIG. 1 illustrates a method for automatic calculation of a forecast response factor, according to various embodiments.

This disclosure describes certain novel techniques for and further improvements to demand modeling or forecasting. Forecasts are used to predict the demand for certain products at given locations in order to increase or maximize sales while keeping storage and other costs low. Inaccurate forecasts can result in an overstock of slow moving products and out-of-stock situations for items during peak demand times. Forecasts are calculated using a response factor (RF) that determines how quickly the forecast should respond to changes in demand. RF is set depending on various factors, such as the nature of the product sales and recent sales patterns. When a product sales pattern changes (e.g., a sudden increase in product demand), RF should be tuned accordingly to adjust the forecast responsiveness.

In the prior art, RF's are set according to a look-up table, which contains numerous parameters. Each parameter usually has to be set and tuned manually by a user, which is inconvenient and can negatively affect the forecast accuracy. The present subject matter provides a mathematical formula that automatically calculates and tunes the forecast RF, based on the nature of the product sales (autocorrelation) and the status of recent forecasts (bias).

Demand Chain Management

Demand Chain Management (DCM) refers to a suite of analytical applications for retail business, that provides retailers with the tools they need for product demand forecasting, planning and replenishment. DCM assists retailers in accurately forecasting product sales at the store/SKU (Stock Keeping Unit) level to ensure high customer service levels are met, and inventory stock at the store level is optimized and automatically replenished. DCM helps retailers anticipate increased demand for products and plan for customer promotions by providing the tools to do effective product forecasting through a responsive supply chain.

DCM is part of a data warehouse solution for the retail industries, and in an embodiment includes modules for contribution, seasonal profile, demand forecasting, promotions management, automated replenishment, time phased replenishment, allocation, load builder and capacity management. A demand forecasting module provides store/SKU level forecasting that responds to unique local customer demand. This module considers both an item's seasonality and its rate of sales (sales trend) to generate an accurate forecast. The module continually compares historical and current demand data and utilizes several methods to determine the best product demand forecast.

DCM models historical sales data to forecast future demand of products. Generating responsive demand forecasts depends upon the accurate calculation of Seasonal Profiles and Average Rate of Sale (ARS) for retail products. DCM utilizes adaptive models to calculate ARS weekly at the product/location level. Once the ARS calculations are complete, the DCM application chooses the appropriate model for the next forecasting period, based on the lowest Average Forecast Error (AFE). Store forecasts can thereafter be used to order the appropriate amounts of products from warehouse or Distribution Centers (DC) to meet customer demand.

Forecast Response Factor

A forecast response factor (RF) determines how quickly the forecasts should react to recent changes in demand. RF is the value applied to the winning average rate of sale (ARS) to determine a new ARS for the current time period (such as a week).

$$ARS_i = ARS_{i-1} \times 1(1-RF) + \text{Winning ARS} \times (RF)$$

RF is set depending on various factors, such as the nature of the product sales and recent sales patterns. When a product sales pattern changes (e.g., a sudden increase in product demand), RF should be tuned accordingly to adjust the forecast responsiveness.

Figure 4A:
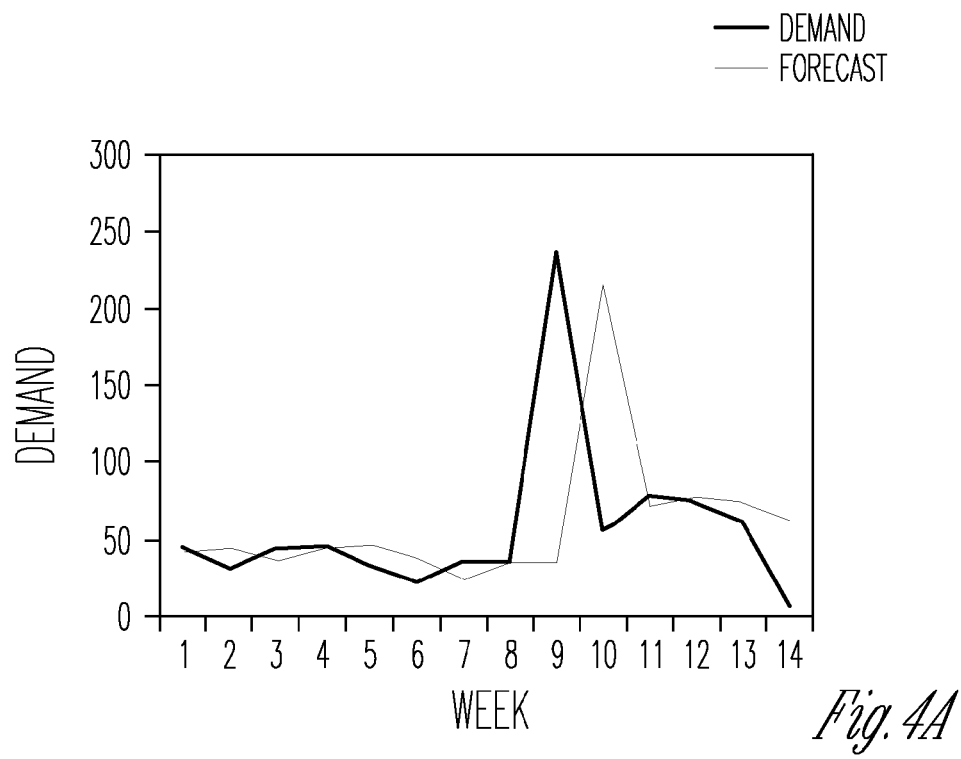
FIG. 4A illustrates a graphical representation of demand over time where the RF is set too high.

FIG. 4A illustrates a graphical representation of demand over time where the RF is set too high. When RF is too high, the forecast chases (follows after) the actual demand fluctuations, which leads to large errors when volatility (e.g. spikes) exist in demand.

Figure 4B:
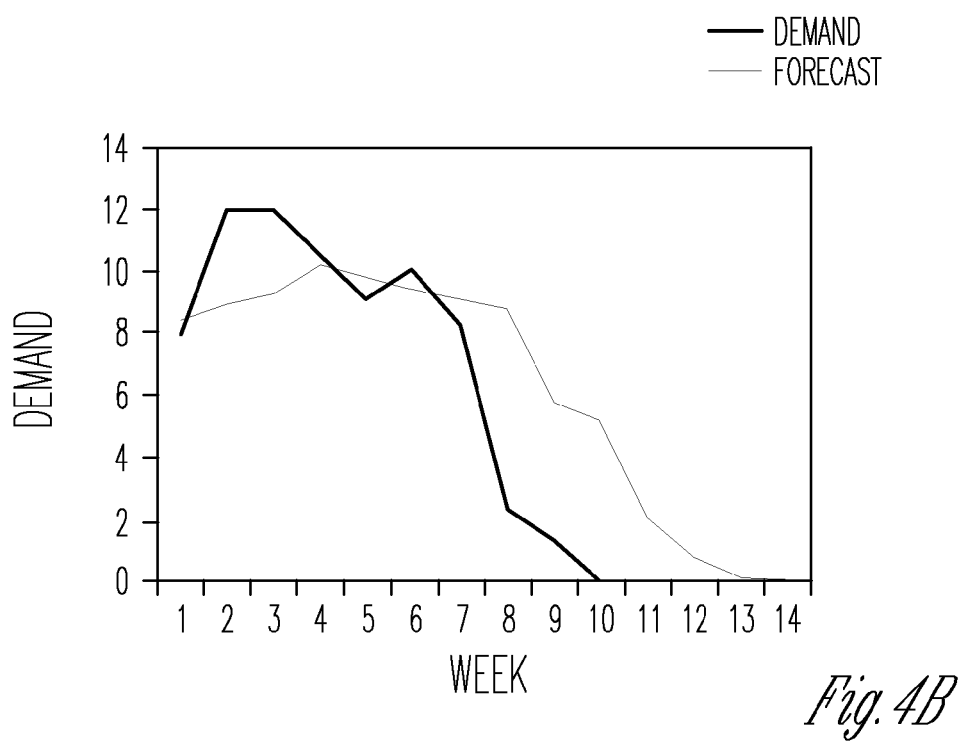
FIG. 4B illustrates a graphical representation of demand over time where the RF is set too low.

FIG. 4B illustrates a graphical representation of demand over time where the RF is set too low. When RF is too low, the forecast does not respond fast enough to systematic changes in demand (e.g. trends or level shifts).

Prior systems for setting the RF are rules based, using a look-up table. Various parameters exist to be set and/or tuned. RF's are changed manually, which is a large burden for users, who want more automation and less manual intervention. The present subject matter provides a fully automated method with no required user intervention, has reasonable computational effort, and has similar or better forecast accuracy with respect to the prior manual system.

The present subject matter employs a formula for calculation of RF:

$$RF = (AC + nB)/2$$

where RF is the response factor, AC is auto-correlation coefficient, B is bias of the last forecast, and n is the number of consecutive over/under forecasts. In various embodiments, the RF formula can be combined with an outlier detection/correct scheme as discussed below. The calculated RF is normally capped at a minimum of 0.1 and a maximum of 0.9. Each of these components of the formula is described in further detail below.

Auto-Correlation

Auto-correlation coefficient (AC) measures the correlation of the demand at each week with that of the previous week. Generally, the higher the AC is, the higher the RF should be. High AC means that the demand of this week is a good predictor of the demand of the next week. The formula for computing auto-correlation can be simplified as:

$$AC = \frac{\sum_{w=1}^{N-1}(d_w - \bar{d})(d_{w-1} - \bar{d})}{\sum_{w=1}^{N}(d_w - \bar{d})^2}$$

FIG. 5 illustrates a table showing the shift of auto-correlation. In an embodiment, the last 5-10 weeks of data is used to calculate AC.

Figure 6A:
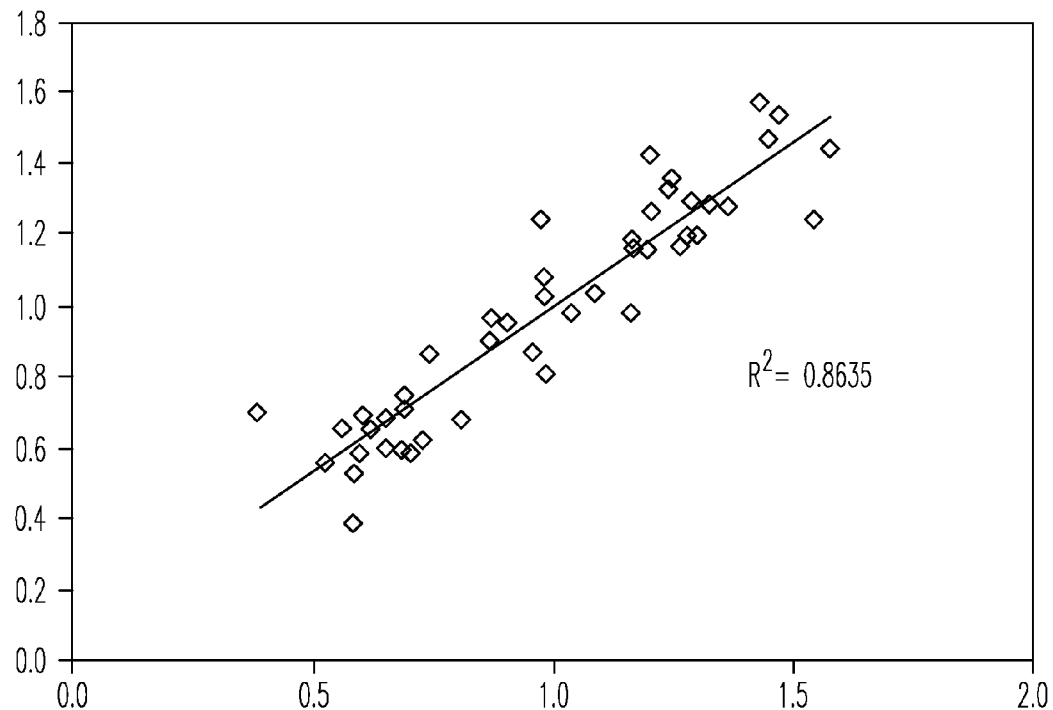
FIG. 6A illustrates a graphical representation of data used to calculate an auto-correlation coefficient.
Figure 6A:
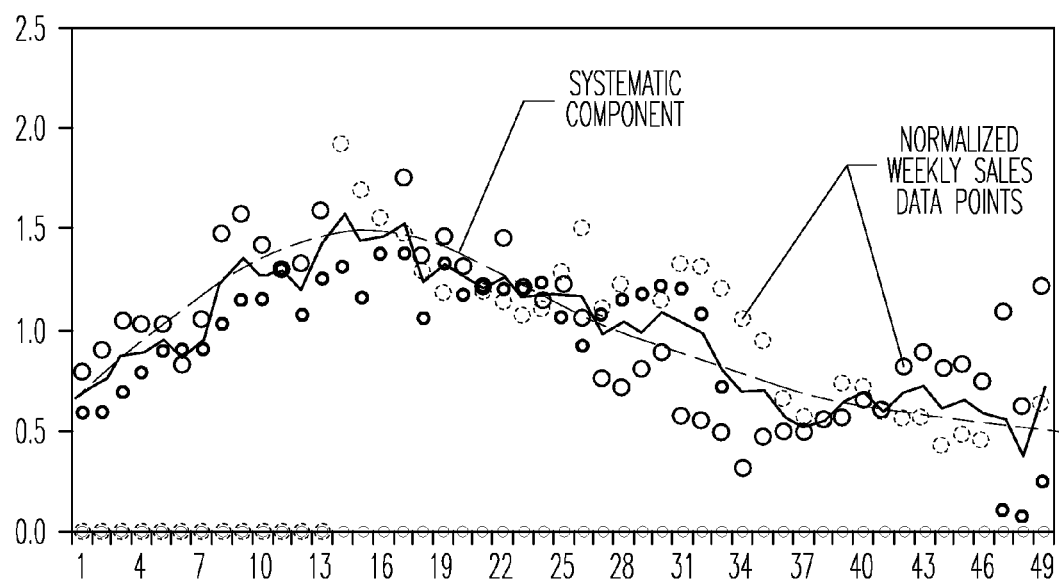
Figure 6B:
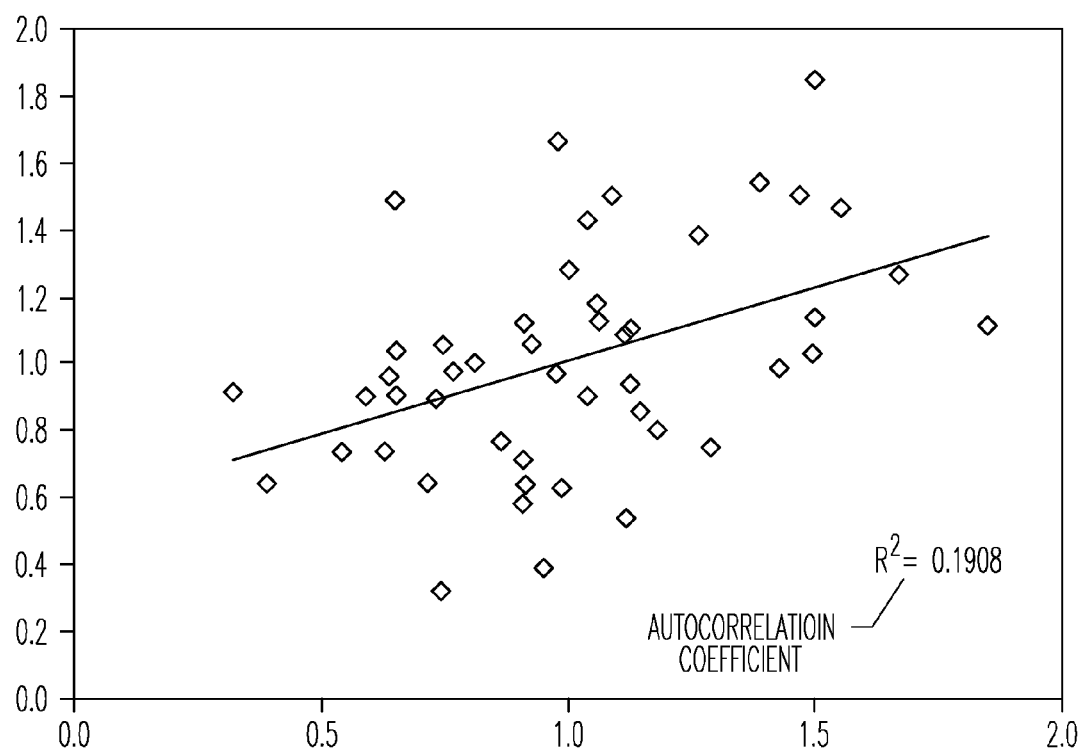
FIG. 6B illustrates another graphical representation of data used to calculate an auto-correlation coefficient.
Figure 6B:
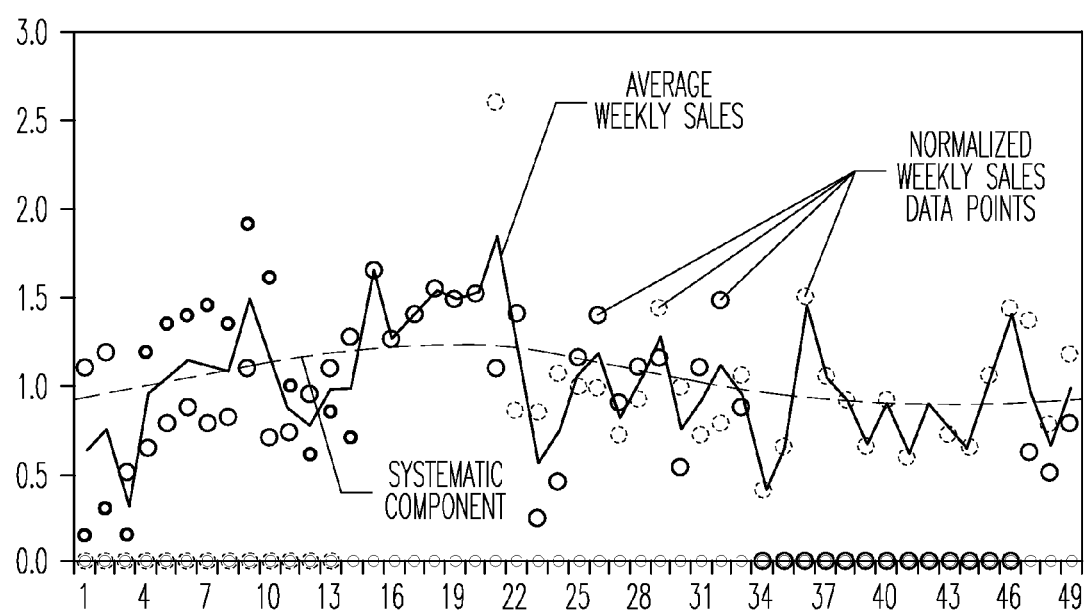

FIG. 6A illustrates a graphical representation of data used to calculate an auto-correlation coefficient. In FIG. 6A, the AC is calculated at a relatively high 0.8635. FIG. 6B illustrates another graphical representation of data used to calculate an auto-correlation coefficient. In FIG. 6B, the AC is calculated at a relatively low 0.1908.

Figures 7A, 7B:
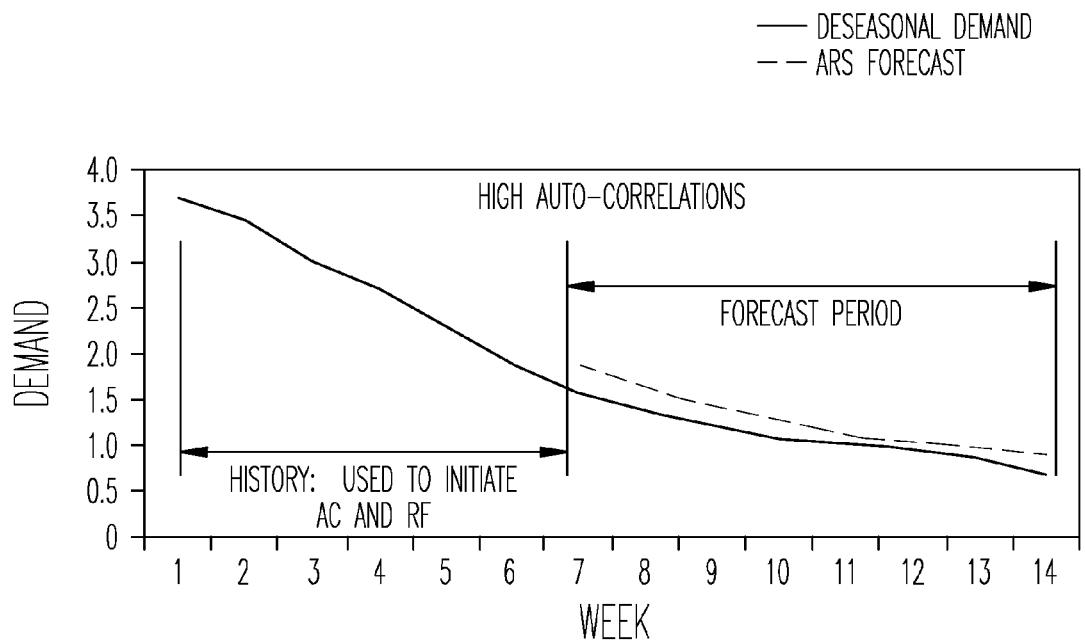
FIG. 7A illustrates a graphical representation of demand over time with high auto-correlations.
FIG. 7B illustrates a table of values over the forecast period shown in FIG. 7A.

FIG. 7A illustrates a graphical representation of demand over time with high auto-correlations. FIG. 7B illustrates a table of values of AC and corresponding RF over the forecast period shown in the above graph.

Figures 8A, 8B:
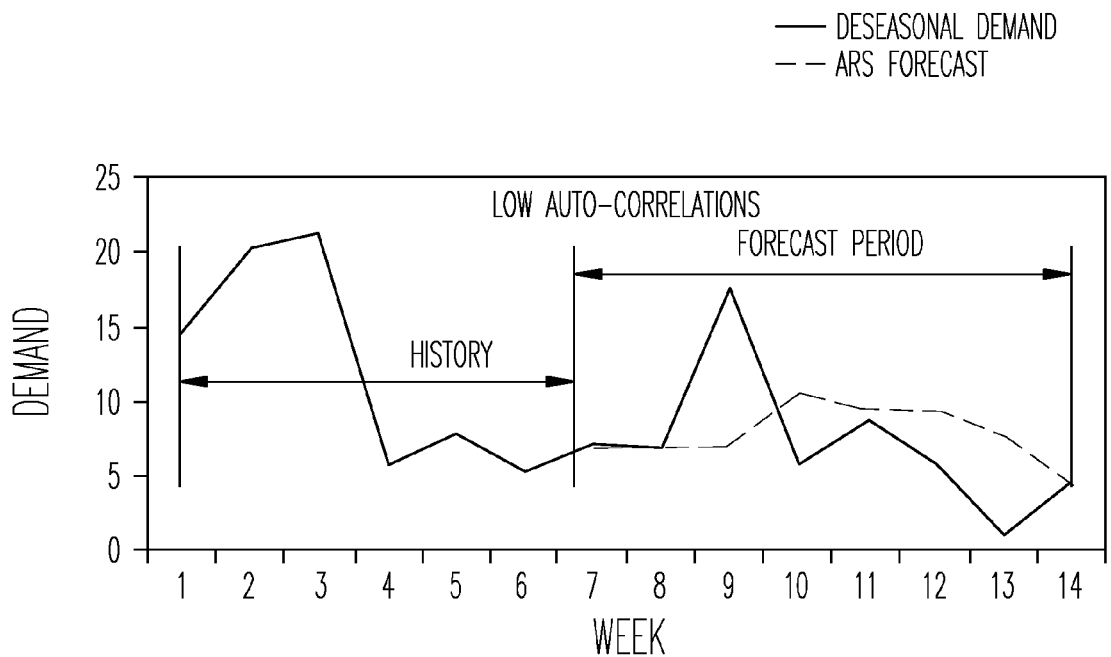
FIG. 8A illustrates a graphical representation of demand over time with low auto-correlations.
FIG. 8B illustrates a table of values over the forecast period shown in FIG. 8A.

FIG. 8A illustrates a graphical representation of demand over time with low auto-correlations. FIG. 8B illustrates a table of values of AC and corresponding RF over the forecast period shown in the above graph.

Bias of the Last Forecast

Bias of the last forecast (B) measures the dimensionless deviation of the last week forecast (ARS) from the actual deseasonalized demand. B is calculated from the following relation (0<B<1):

$$B = \frac{|ARS_{i-1} - DsDmnd_{i-1}|}{\max(ARS_{i-1}, DsDmnd_{i-1})}$$

Where DsDmnd, is the deseasonalized demand at week i, and ARS, is the ARS forecast at week i. Deseasonalized demand is the demand that would have been observed in the absence of seasonal fluctuations. When the bias (B) is large, a large response factor (RF) should be used to close the gap between the actual demand and the forecast.

Number of Consecutive Over/under Forecasts

The number of consecutive over/under forecasts (n) indicates the number of times that the forecasts (ARS) fall over or under the actual deseasonalized demand. When n is large, the response factor (RF) should be increased to close the gap between the demand and forecast.

Figures 9A, 9B:
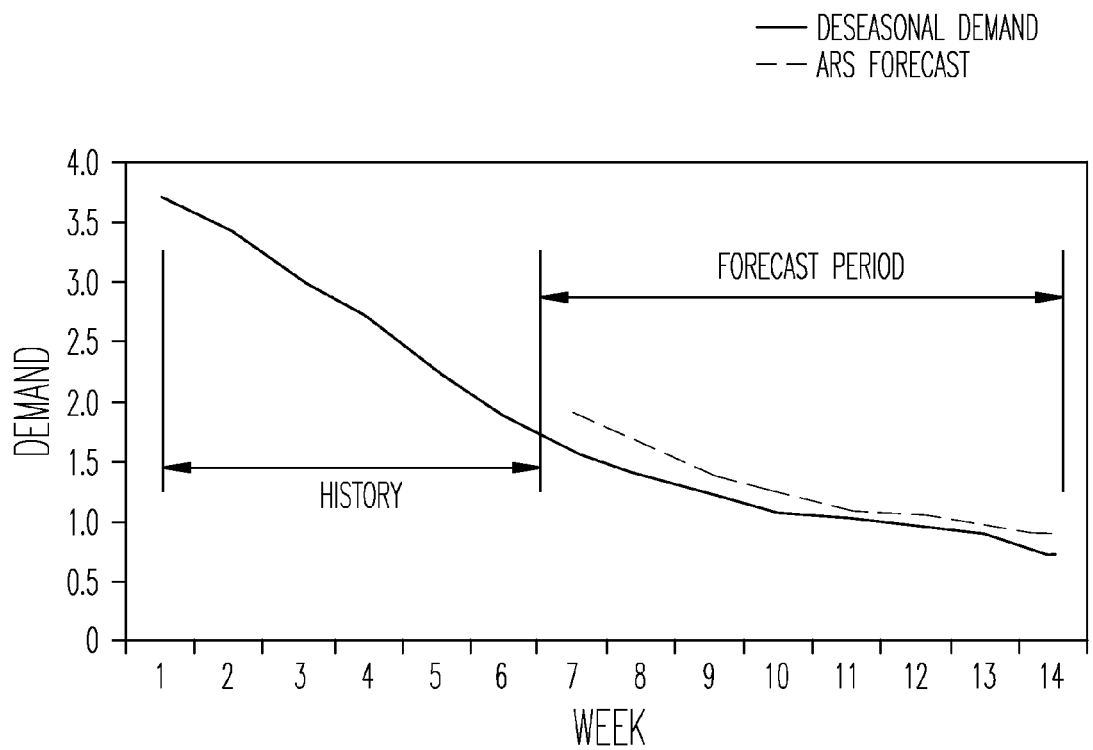
FIG. 9A illustrates a graphical representation of demand over time.
FIG. 9B illustrates a table of values over the forecast period shown in FIG. 9A.

FIG. 9A illustrates a graphical representation of demand over time. FIG. 9B illustrates a table of values of n, B and (n×B) over the forecast period shown in the above graph.

Outlier Detection and Correction

As stated above, in various embodiments the RF formula can be combined with an outlier detection and correction scheme. Outlier detection and correction is used to avoid extreme forecasts caused by sudden and temporary changes in demand (e.g. spikes). An example of a formula used to detect and revise extreme data points is as follows:

1. The acceptable range of demand for week i is defined as:

$$ARS_i \pm 2STD$$

Where $ARS_i$ is the expected demand (i.e. the forecast) for week i, and STD is the standard deviation of deseasonalized demand, DsDmnd, for the past 6 weeks.

2. If DsDmnd, falls outside the acceptable range, it is corrected to the closest acceptable point, or boundary of the range.

Figure 10A:
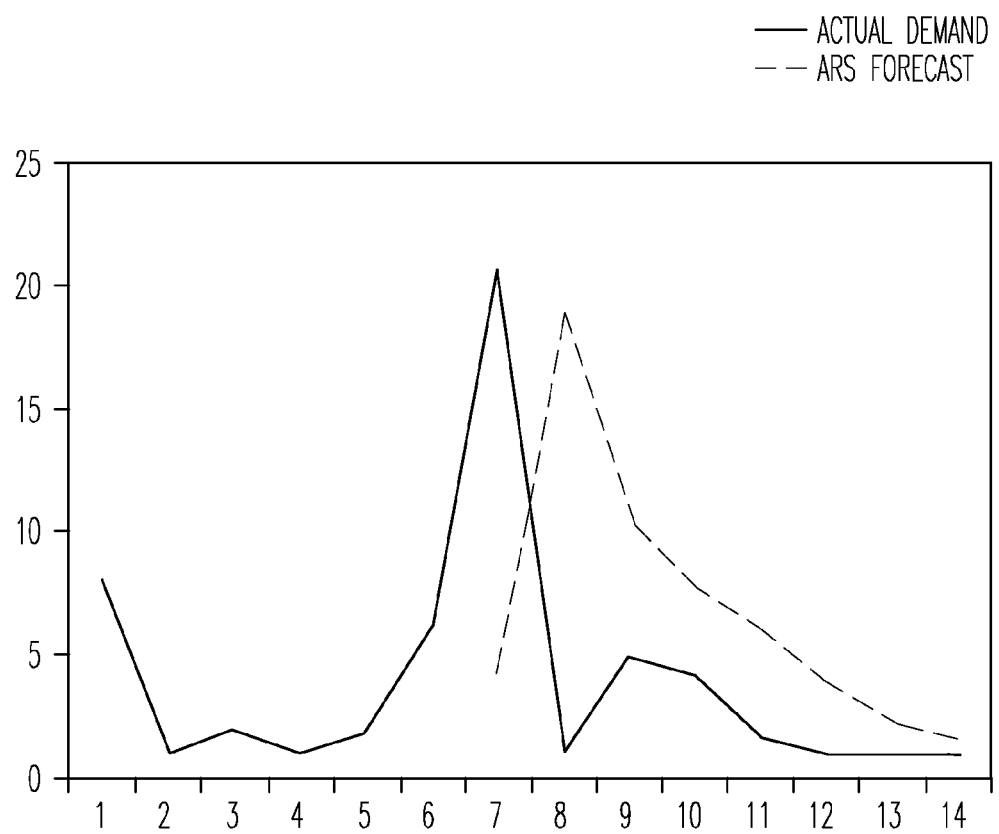
FIG. 10A illustrates a graphical representation of demand over time showing a forecast that does not use outlier detection/correction.

FIG. 10A illustrates a graphical representation of demand over time showing a forecast that does not use outlier detection/correction. Without outlier detection and correction, a spike in demand causes an extreme forecast and large errors.

Figure 10B:
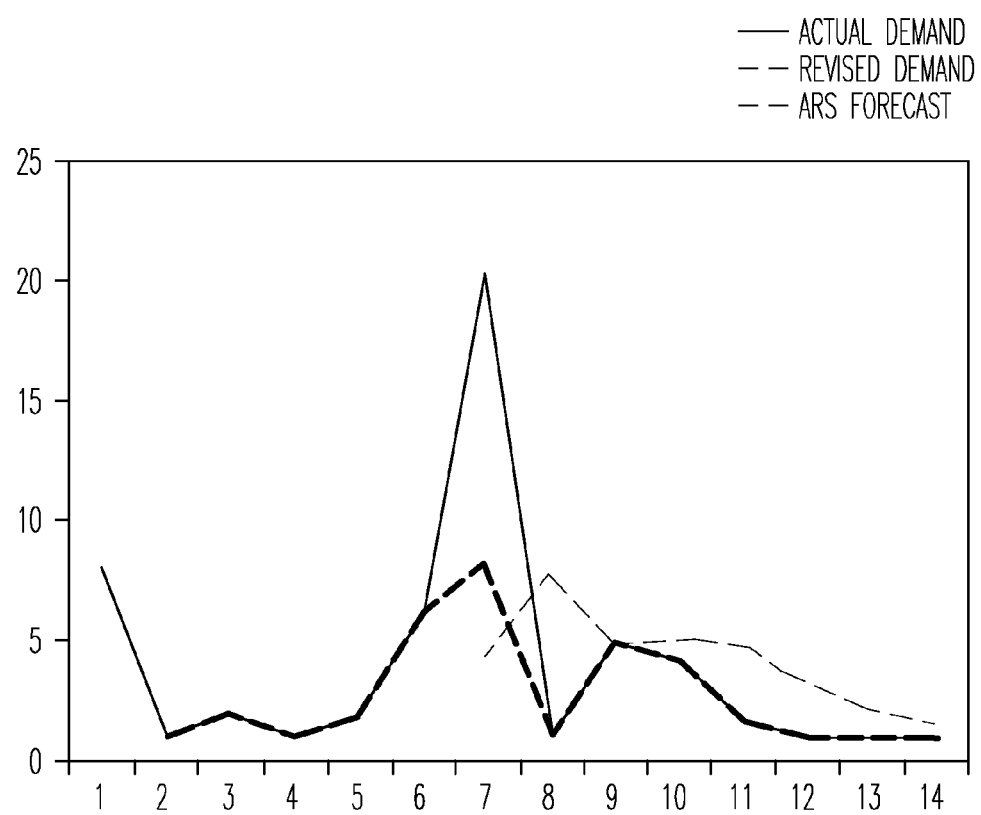
FIG. 10B illustrates a graphical representation of demand over time showing a forecast that uses outlier detection/correction.

FIG. 10B illustrates a graphical representation of demand over time showing a forecast that uses outlier detection/correction. With outlier detection and correction, the spike (demand of week 7) is revised to a moderate value, before the forecast for week 8 is calculated. Note that the forecast for week 7 is the same in both graphs.

Methods for Automatically Calculating Forecast Response Factor

FIG. 1 illustrates a method 100 for automatic calculation of a forecast response factor, according to various embodiments. The machine-implemented method includes determining an auto-correlation coefficient (AC) using historical demand data, at 105, and determining a bias of last forecast (B) using a previous forecast and historical demand data, at 110. The method 100 also includes determining a number of consecutive over/under forecasts (n) using previous forecasts, at 115, and automatically calculating a forecast response factor (RF) using the auto-correlation coefficient, the bias of last forecast and the number of consecutive over/under forecasts, at 120.

According to various embodiments, automatically calculating RF includes multiplying the number of consecutive over/under forecasts by the bias of the last forecast, adding the auto-correlation coefficient, and dividing the sum by 2. The calculated RF is limited to a maximum of about 0.9 and a minimum of about 0.1, in various embodiments. Determining AC includes measuring correlation between demand in a time period with demand in a previous time period. In one embodiment, the previous time period is 5 weeks. In another embodiment, the previous time period is 10 weeks. Other time periods can be used without departing from the scope of this disclosure. Determining B includes measuring dimensionless deviation of a last week forecast from actual deseasonalized demand, in an embodiment. In various embodiments, determining n includes measuring a number of times forecasts fall over or under actual deseasonalized demand. Various embodiments of the present subject matter use using outlier detection and/or outlier correction to avoid extreme forecasts caused by sudden and temporary changes in demand.

Figure 2:
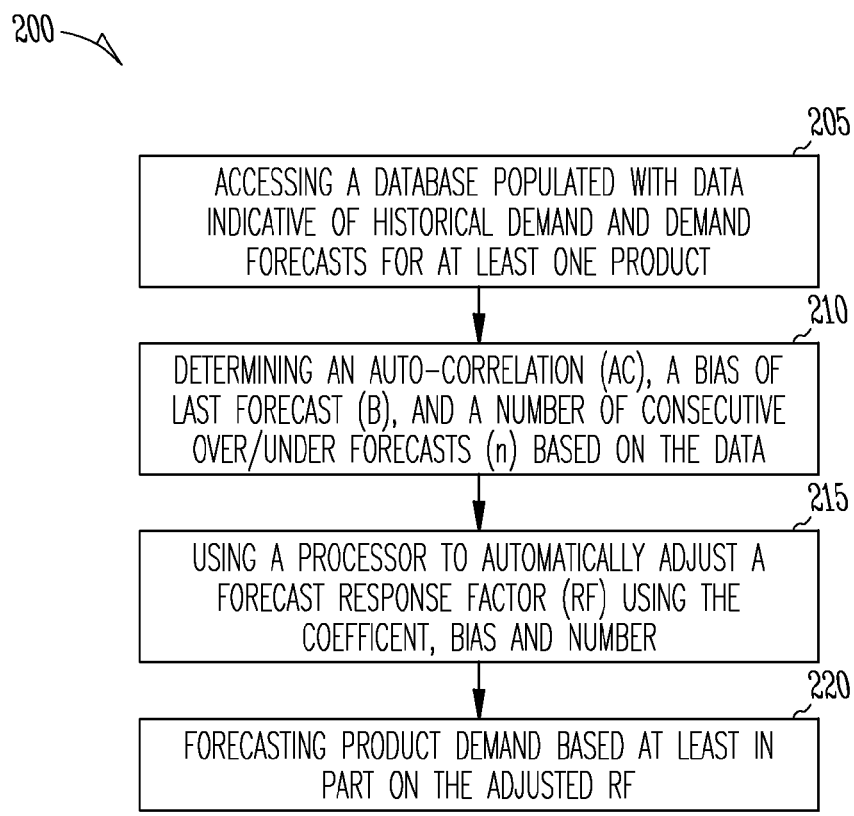
FIG. 2 illustrates a method for forecasting product demand using an automatically calculated forecast response factor, according to various embodiments.

FIG. 2 illustrates a method 200 for forecasting product demand using an automatically calculated forecast response factor, according to various embodiments. The machine-implemented method includes accessing a database populated with data indicative of historical demand and demand forecasts for at least one product, at 205, and determining an auto-correlation coefficient (AC), a bias of last forecast (B), and a number of consecutive over/under forecasts (n) based on the data, at 210. The method 200 also includes using a processor to automatically adjust a forecast response factor (RF) using the coefficient, bias and number, at 215, and forecasting product demand based at least in part on the adjusted RF, at 220.

According to various embodiments, forecasting product demand includes calculating a projected average rate of sales (ARS). In one embodiment, calculating ARS includes multiplying the adjusted RF by a previous ARS. Automatically adjusting RF includes multiplying the number of consecutive over/under forecasts by the bias of the last forecast, adding the auto-correlation coefficient, and dividing the sum by 2, according to various embodiments. The adjusted RF is limited to a maximum of about 0.9 and a minimum of about 0.1, in various embodiments. Forecasting product demand includes detecting and correcting outlier values to avoid extreme forecasts caused by sudden and temporary changes in demand, in an embodiment. One type of outlier detection and correction includes calculating a standard deviation of deseasonalized demand for a previous time period and limiting the projected ARS to an acceptable range, the range calculated using the standard deviation. Various embodiments of the discussed methods for calculating a forecast response factor can be implemented using the various systems discussed below.

System for Automatically Calculating Forecast Response Factor

Figure 3:
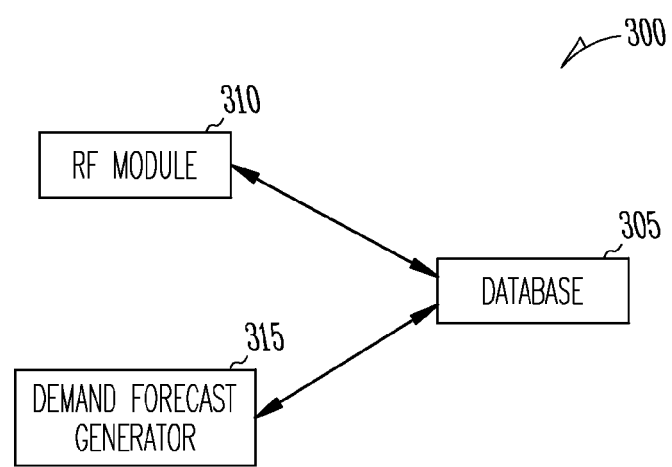
FIG. 3 illustrates a system for automatically calculating a forecast response factor and generating demand forecasts using the response factor, according to various embodiments.

FIG. 3 illustrates a system 300 for automatically calculating a forecast response factor and generating demand forecasts using the response factor, according to various embodiments. The system 300 is implemented as instructions within one or more machine accessible or computer-readable medium. The system 300 implements, among other things, the methods 100 and 200 of the FIGS. 1 and 2.

The system 300 includes forecast response factor module 310, a demand forecast generator 315, and a relational database 305. The forecast response factor module 310 is integrated with the demand forecast generator in certain embodiments. According to various embodiments, the database 305 includes a plurality of entries corresponding to historical demand data and forecast data for a product. The forecast response factor module 310 is configured to access the database and calculate a forecast response factor based on at least one of the entries, according to an embodiment. The forecast response factor includes an indication of responsiveness of a forecast to changes in demand. In various embodiments, the demand forecast generator 315 is configured to access the database and receive the forecast response factor, and is further configured to generate demand forecasts using the calculated forecast response factor.

According to various embodiments, the forecast response factor module includes an auto-correlation coefficient module, a bias of last forecast module and a number of consecutive over/under forecasts module. The auto-correlation coefficient module is configured to access the database and calculate based on at least one of the entries, in an embodiment. In various embodiments, the bias of last forecast module is configured to access the database and calculate a bias of last forecast based on at least one of the entries. The number of consecutive over/under forecasts module is configured to access the database and calculate a number of consecutive over/under forecasts based on at least one of the entries, according to various embodiments. The demand forecast generator includes an outlier detection and correction module configured to detect and correct outlier values to avoid extreme forecasts caused by sudden and temporary changes in demand, in an embodiment.

Certain embodiments of the inventions described in this disclosure provide advantages over the prior art. For example, some embodiments provide improved forecast accuracy. In addition, the present subject matter provides a fully automated method for calculation RF with no required user intervention. Using the present subject matter, RF's can be easily tuned over time to account for recent changes in product sales patterns. The presented method is computationally efficient and scalable. Unlike typical optimization methods that rely on iterative algorithms, the present subject matter employs a deterministic mathematical formula, which can be calculated or updated as new data points become available. It will be understood that other advantages can be realized utilizing the novel features described in this disclosure, and that not every advantage or feature described herein will be present in every embodiment.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

What is claimed is:

1. A machine-implemented method residing in a non-transitory computer-readable medium and executed by a machine, comprising:
    determining, by the machine, an auto-correlation coefficient (AC) using historical demand data, the AC measures a correlation of demand at each week with respect to that of a previous week, demand values are present in the historical demand data for each week for a given product or service;
    determining, by the machine, a bias of last forecast (B) using a previous forecast and historical demand data, the bias measures a dimensionless deviation of a last week sales forecast for the given product or service from an actual de-seasonalized demand, the bias is calculated as the absolute value of the last weeks sales forecast minus a last weeks de-seasonalized demand, the absolute value is then divided by the max of the last weeks sales forecast and the last weeks de-seasonalized demand;
    determining, by the machine, a number of consecutive over/under forecasts (n) using previous forecasts, n measures a specific number of times that sales forecasts falls over or falls under actual de-seasonalized demand; and
    automatically calculating, by the machine, a forecast response factor (RF) using the auto-correlation coefficient, the bias of last forecast and the number of consecutive over/under forecasts, wherein automatically calculating the RF is calculated as a sum of the auto-correlation coefficient added to a product of the number of consecutive over/under forecasts and the bias of the last forecast, the sum is then divided by 2.

2. The method of claim 1, wherein automatically calculating RF includes limiting RF to a maximum of 0.9.

3. The method of claim 1, wherein automatically calculating RF includes limiting RF to a minimum of 0.1.

4. The method of claim 1, wherein determining AC includes measuring correlation between demand in a time period with demand in a previous time period.

5. The method of claim 4, wherein determining AC includes measuring correlation between demand in a week with demand in a previous 5 weeks.

6. The method of claim 4, wherein determining AC includes measuring correlation between demand in a week with demand in a previous 10 weeks.

7. The method of claim 1, wherein determining B includes measuring dimensionless deviation of a last week forecast from actual deseasonalized demand.

8. The method of claim 1, wherein determining n includes measuring a number of times forecasts fall over or under actual deseasonalized demand.

9. The method of claim 1, further comprising:
    using, by the machine, outlier detection to avoid extreme forecasts caused by sudden and temporary changes in demand.

10. The method of claim 9, further comprising:
    using, by the machine, outlier correction to avoid extreme forecasts caused by sudden and temporary changes in demand.

11. A machine-implemented method, comprising:
    accessing a database populated with data indicative of historical demand and demand forecasts for at least one product;
    determining an auto-correlation coefficient (AC), a bias of last forecast (B), and a number of consecutive over/under forecasts (n) based on the data, the AC measures a correlation of demand at each week with respect to that of a previous week, demand values are present in the historical demand for each week for the at least one product, the bias measures a dimensionless deviation of a last week sales forecast for the product from an actual de-seasonalized demand, the bias is calculated as the absolute value of the last weeks sales forecast minus a last weeks de-seasonalized demand, the absolute value is then divided by the max of the last weeks sales forecast and the last weeks de-seasonalized demand, the number measures a specific number of times that sales forecasts falls over or falls under actual de-seasonalized demand;
    using a processor to automatically adjust a forecast response factor (RF) using the coefficient, bias and number, wherein automatically adjusting the RF includes automatically calculating the RF as a sum of the auto-correlation coefficient added to a product of the number of consecutive over/under forecasts and the bias of the last forecast, the sum is then divided by 2; and
    forecasting product demand based at least in part on the adjusted RF.

12. The method of claim 11, wherein forecasting product demand includes calculating a projected average rate of sales (ARS).

13. The method of claim 12, wherein calculating ARS includes multiplying the adjusted RF by a previous ARS.

14. The method of claim 11, wherein forecasting product demand includes detecting and correcting outlier values to avoid extreme forecasts caused by sudden and temporary changes in demand.

15. The method of claim 14, wherein detecting and correcting outlier values includes calculating a standard deviation of deseasonalized demand for a previous time period and limiting the projected ARS to an acceptable range, the range calculated using the standard deviation.

16. A system, comprising:
    a database comprising a plurality of entries corresponding to historical demand data and forecast data for a product;
    a forecast response factor module configured to access the database and calculate a forecast response factor (RF) based on at least one of the entries, wherein the forecast response factor includes an indication of responsiveness of a forecast to changes in demand and wherein the calculated RF is calculated as a sum of an auto-correlation coefficient added to a product of a number of consecutive over/under forecasts and a bias of the last forecast, the sum is then divided by 2; and
    a demand forecast generator configured to access the database and receive the forecast response factor, the demand forecast generator further configured to generate demand forecasts using the calculated forecast response factor.

17. The system of claim 16, wherein the forecast response factor module includes:
    an auto-correlation coefficient module configured to access the database and calculate the auto-correlation coefficient (AC) based on at least one of the entries, the AC measures a correlation of demand at each week with respect to that of a previous week, demand values are present in the historical demand data for each week for the product;

a bias of last forecast module configured to access the database and calculate the bias of last forecast based on at least one of the entries, the bias measures a dimensionless deviation of a last week sales forecast for the product from an actual de-seasonalized demand, the bias is calculated as the absolute value of the last weeks sales forecast minus a last weeks de-seasonalized demand, the absolute value is then divided by the max of the last weeks sales forecast and the last weeks de-seasonalized demand; and a number of consecutive over/under forecasts module configured to access the database and calculate the number of consecutive over/under forecasts based on at least one of the entries, the number measures a specific number of times that sales forecasts falls over or falls under actual de-seasonalized demand.

18. The system of claim 16, wherein the demand forecast generator includes:

an outlier detection and correction module configured to detect and correct outlier values to avoid extreme forecasts caused by sudden and temporary changes in demand.

* * * * *